United States Patent
Jahnes et al.

(10) Patent No.: US 6,214,482 B1
(45) Date of Patent: Apr. 10, 2001

(54) DIELECTRIC-LAYER FOR MAGNETO-OPTIC STORAGE MEDIA STRUCTURES

(75) Inventors: Christopher Vincent Jahnes, Monsey; Fletcher Jones, Ossining; Joseph Skinner Logan, Poughkeepsie; Michael Allen Russak, Brewster, all of NY (US)

(73) Assignee: Information Business Machines Corporation, Armonk, NY (US)

( * ) Notice: Subject to any disclaimer, the term of this patent is extended or adjusted under 35 U.S.C. 154(b) by 0 days.

(21) Appl. No.: 08/224,067

(22) Filed: Apr. 7, 1994

Related U.S. Application Data

(63) Continuation of application No. 07/885,068, filed on May 18, 1992, now abandoned, which is a continuation of application No. 07/473,013, filed on Jan. 31, 1990, now abandoned.

(51) Int. Cl.$^7$ ............................................. G11B 5/66
(52) U.S. Cl. .................. 428/694 ML; 428/694 DE; 428/694 XS; 428/694 NF; 428/694 ST; 428/694 SG; 428/900; 501/56; 501/59; 501/61; 501/62; 501/66; 501/67
(58) Field of Search ............... 428/694 DE, 694 ML, 428/694 XS, 694 NF, 94 ST, 694 SG, 900; 501/67, 56, 59, 61, 62, 66

(56) References Cited

U.S. PATENT DOCUMENTS

| | | | |
|---|---|---|---|
| 4,268,369 | 5/1981 | Barlow et al. | 204/192.16 |
| 4,386,130 | * 5/1983 | Hayashi et al. | 428/215 |
| 4,569,881 | 2/1986 | Freese et al. | 428/213 |
| 4,610,912 | * 9/1986 | Takahashi et al. | 428/213 |
| 4,640,900 | * 2/1987 | Kokubu et al. | 501/67 |
| 4,680,742 | * 7/1987 | Yamada et al. | 369/13 |
| 4,701,371 | 10/1987 | Aoyama et al. | 428/323 |
| 4,800,112 | * 1/1989 | Kano et al. | 428/163 |
| 4,849,304 | * 7/1989 | Uchiyama et al. | 428/694 XS |
| 5,192,626 | * 3/1993 | Sekiya et al. | 428/694 R |

FOREIGN PATENT DOCUMENTS

| | | |
|---|---|---|
| 210405 | * 2/1987 | (EP) . |
| 0368194 | 5/1990 | (EP) . |
| 2164269 | * 3/1986 | (GB) . |
| 34747 | * 2/1986 | (JP) . |
| 131224 | * 6/1986 | (JP) . |
| 267944 | * 11/1987 | (JP) . |
| 8900742 | 1/1989 | (WO) . |

OTHER PUBLICATIONS

Nogami, "Glass Preparation of the $ZrO_2$–$SiO_2$ System by the Sol–Gel Process from Metal Alkoxides", J Non–Crys. Solids, 69, 1985, 415–423.

Asano et al, "Magneto–Optical Recording Media with New Protective Films", Intermag '87, Paper CG–10.

Patents Abstracts of Japan, vol. 10, N. 169, P. 468, (2225), Jun. 14, 1986.

\* cited by examiner

*Primary Examiner*—Leszek Kiliman
(74) *Attorney, Agent, or Firm*—Scully, Scott, Murphy & Presser; Stephen C. Kaufman, Esq.

(57) ABSTRACT

A dielectric layer for use in a magneto-optic storage medium contains a compound glass of $SiO_2$—$MO_2$, $SiO_2$—$M_2O_3$, or $SiO_2$—$M_2O_5$ and combinations thereof where M is selected from Zr, Ti, Al, Nb, Y, Sn, In, Ta and Sb.

39 Claims, 7 Drawing Sheets

DIELECTRIC-LAYER FOR MAGNETO-OPTIC STORAGE MEDIA STRUCTURES

This is a continuation of application Ser. No. 07/885,068 filed on May 18, 1992, now abandoned which is a continuation of Ser. No. 07/473,013 filed on Jan. 31, 1990, now abandoned.

BACKGROUND OF THE INVENTION

The present invention relates to magneto-optic storage media and specifically relates to adjustment of the refractive index, density and chemical durability of the dielectric layers used in a magneto-optic storage medium. Quite specifically, the invention relates to the use of compound oxide glasses of $SiO_2$—$MO_2$, $SiO_2$—$M_2O_3$ or $SiO_2$—$M_2O_5$ and combinations thereof as the dielectric layer, where M is selected from but not limited to Zr, Ti, Al, Nb, Y, Sn, In, Ta and Sb.

Magneto-optic recording media refer to a storage medium or memory element which corresponds to radiant energy permitting the use of such energy sources as laser beams for both recording and reading. The media modify the character of an incident polarized light beam so that the modification can be detected by an electronic device such as a photodiode. Magneto-optic recording media have several advantages over known magnetic recording media: the spacing between the medium and the recording head is greater thereby reducing the potential for contact between the two and use of a pulsed laser beam as the writing implement results in very high density data storage. The use of magneto-optic storage media and the manner of writing data onto and reading data from the medium are both well-known to those skilled in the art.

Rare earth-transition metal amorphous alloys constitute a class of magnetic materials which are magneto-optically active, have large coercivity and magnetic anisotropy values at room temperature, and thus hold promise as an active media for a reversible storage technology based on optical recording. In a typical disk storage media structure, the active magneto-optic layer is sputter-deposited on a grooved substrate on which a first thin dielectric layer has previously been deposited and then a second thin dielectric layer is deposited on the magneto-optic layer, thereby sandwiching the magneto-optic layer between a pair of thin dielectric layers. The dielectric layers provide appropriate refractive index matching to maximize optical coupling into the magneto-optical media, thermal isolation and environmental stability for the magneto-optic layer.

Dielectric layers containing simple oxides such as $ZrO_2$, $SiO_2$, $Al_2O_3$, $Ta_2O_5$ and $Nb_2O_3$ have been tried but as a class these materials have generally not been adequate to provide acceptable signal enhancement and environmental protection. This is due to their tendency in some cases to crystallize during thermal cycling and/or allow penetration of atmospheric contaminants to the magneto-optic layer. Other compounds such as nitrides, oxynitrides and amorphous carbon likewise exhibit shortcomings when used as dielectric layers in a magneto-optic storage media due to a variety of factors such as unacceptable stress levels in the films and poor surface coverage. Also, in these latter cases the compounds used provide only discrete index of refraction values and the optical design of the magneto-optic storage disk must be predicated upon that discrete value.

U.S. Pat. No. 4,680,742 describes a magneto-optic recording element comprising a substrate, a magnetic layer and a dielectric layer, the dielectric layer being formed by deposition of a composition comprising $Si_3N_4$ and a refractive index-improving agent such as $Al_2O_3$ or $Y_2O_3$. Such a nitride containing medium is sensitive to residual gas impurities in the vacuum system during deposition. For example, if oxygen is in the reaction chamber in sufficient quantity a silicon oxynitride may be formed in the dielectric layer which will greatly reduce the refractive index of the dielectric layer.

U.S. Pat. No. 4,569,881 describes a magneto-optic storage media comprising at least one dielectric layer to enhance the coupling of a read/write laser light into the magneto-optic material. The dielectric layers comprise an oxide or nitride. There is no mention of any adjustment of index of refraction or the degree of environmental protection provided by the dielectric layers.

SUMMARY OF THE INVENTION

In accordance with the present invention, in order to overcome the limitations found in the described magneto-optic storage media and to achieve improved signal-to-noise ratio and environment stability, the dielectric layer comprises a compound oxide glass. The preferred glass has the chemical formula $SiO_2$—$MO_2$ or $SiO_2$—$M_2O_3$ and $SiO_2$—$M_2O_5$ where M is selected from but not limited to Zr, Ti, Al, Nb, Y, Sn, In, Ta or Sb and preferably is Ti, Zr or Al. A principal object of the present invention is therefore, the provision of a magneto-optic storage medium exhibiting stable, protective, high, and precisely controllable and adjustable index of refraction dielectric layers for magneto-optic storage.

Another object of the present invention is the provision of a magneto-optic storage medium including at least one dielectric layer comprising a compound oxide glass.

A further object of the present invention is the provision of a magneto-optic storage medium including at least one dielectric layer comprising a compound oxide glass, where the compound oxide glass has the chemical formulation $SiO_2$—$MO_2$ or $SiO_2$—$M_2O_3$ or $SiO_2$—$M_2O_5$ and combinations thereof where M is selected from but not limited to Zr, Ti, Al, Nb, Y, Sn, In, Ta and Sb.

Further and still other objects of the present invention will become more clearly apparent when the following description is read in conjunction with the accompanying drawings.

DETAILED DESCRIPTION

Figure 1:
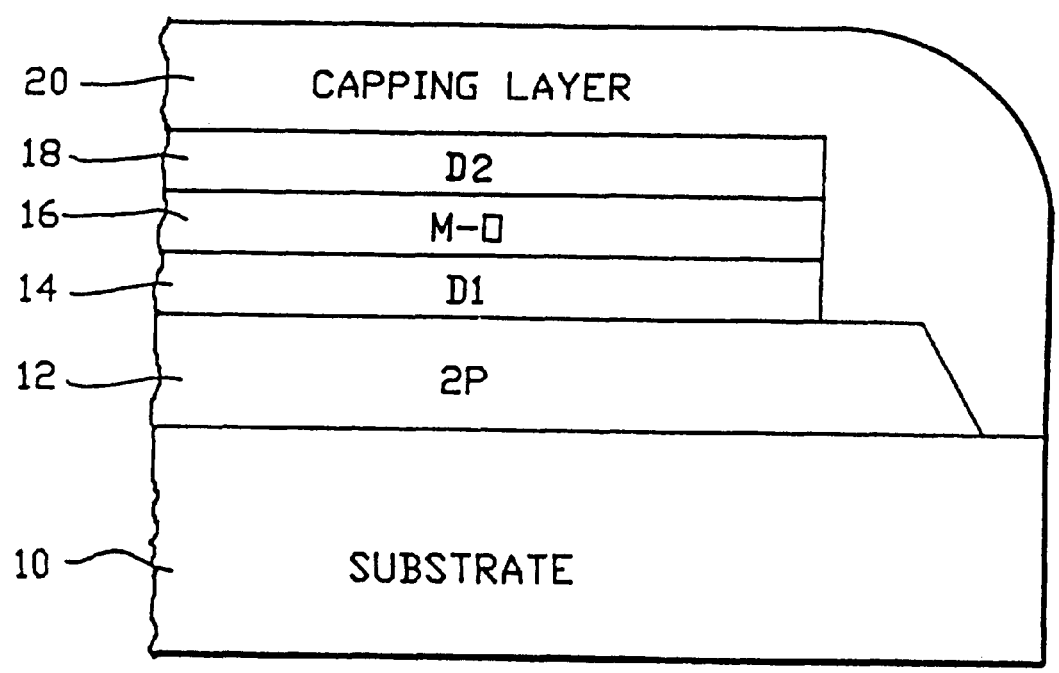
FIG. 1 is a partial sectional view of a preferred magneto-optic storage medium constructed in accordance with the teachings of the present invention.

Referring now to the figures and to FIG. 1 in particular, there is shown in partial section a preferred magneto-optic storage medium construction in the form of a multi-layer stack comprising a substrate 10, a plastic first layer 12 (also referred to as a 2P layer) disposed on the substrate, a first dielectric layer 14 (also referred to as a D1 layer) disposed on the 2P layer, a magneto-optic thin film material 16 disposed on the D1 layer, and a second dielectric layer 18 (also referred to as a D2 layer) disposed on the magneto-optic material layer. The layers 12, 14, 16 and 18 are covered by a protective or capping layer 20.

Magneto-optic storage is accomplished by using a laser light source to change the magnetic orientation of selected portions of a magneto-optic thin film material which has been deposited on a substrate.

Actual information storage is accomplished by using focused laser radiation as a heat source to raise the temperature of selected portions (bits) of the magneto-optic film to a temperature where it no longer maintains a vertical magnetization and then reorienting the heated bit of material in the reverse direction compared to the unheated portion of the film. This will cause the reoriented piece of material to interact differently with a lower intensity read laser beam thereby allowing binary storage states. There are two types of magneto-optic effects which are utilized in storage: the Kerr effect, in which polarized light is reflected off the surface of the magneto-optic film and the rotation of the reflected beam is measured, and the Faraday effect, in which the rotation of polarized light passing through the magneto-optic film is measured. A slight variation of the second method utilizes a reflecting layer between layers 18 and 20 shown in FIG. 1 or alternatively the material of layer 20 is selected to perform the reflection function as well as capping. Such a layer allows for multiple passes of light through the magneto-optic film thereby enhancing the Faraday signal. In the Faraday mode the magneto-optic layer and D2 layers are thinner than in the Kerr mode as the light beam must pass through them. It should be noted that the optimum indicies of refraction and thicknesses for layers 16 and 18 are not the same in all cases. Therefore, the ability to adjust the index of refraction of dielectric layers is desirable and allows for attainment of maximum performance in terms of signal to noise ratio, optical efficiency, thermal considerations and the like for a given storage medium design. The method of constructing the magneto-optic storage medium and the preferred materials comprising each of the layers will be described hereinafter.

The substrate 10 preferably comprises glass or plastic and is of sufficient thickness, as will be apparent to one skilled in the art, to provide structural and mechanical integrity to the completed medium structure. The plastic layer 12, which is usually grooved, is typically a photosensitive polymer material which may be patterned by standard photolithographic and etching techniques and is typically 1 to 2 $\mu$m thick. The function of the grooves is to keep the laser head on the correct track while reading and/or writing on the medium.

Previously, the dielectric layers 14 and 18 have usually been constructed of electrically insulating materials such as, but not limited to, silicon oxide, carbide, nitride, aluminum oxide, titanium dioxide and zirconium oxide. The index of refraction of the dielectric layer is critical in terms of optimizing the amount of light which is coupled to the magneto-optic layer 16 disposed between the two dielectric layers 14 and 18, and assumes an optimum value depending on the exact stack configuration, i.e., utilizing the Kerr or Faraday effects for data storage. The signal-to-noise ratio of an erasable magneto-optic storage medium is proportional to $\theta\sqrt{R}$ where R is the reflectivity of the medium and $\theta$ is the angle of rotation.

The storage medium is preferably constructed according to the following procedure. Plastic layer 12 is photo-etched onto substrate 10 to form a plurality of grooves at preselected locations on the surface of the substrate. First dielectric layer 14 is sputter deposited onto the plastic layer 12 directly from compound targets or reactively from elemental targets and is typically less than 1000 Å thick. A thin film layer of magneto-optic material 16 is deposited onto the first dielectric layer 14. A second dielectric layer 18 is then deposited onto the magneto-optic material 16 in a manner similar to the deposition of the first dielectric layer.

The first dielectric layer 14 and the second dielectric layer 18 which generally comprise the same composition may in certain application comprise different compositions both in terms of the M containing component and the relative percentages of $SiO_2$ and the M containing component.

The above described medium of dielectric layers and magneto-optic film can be replicated in order to form a stack of such media.

In order to provide further environmental stability a protective or capping layer 20 is deposited over the described stack.

The preferred method of manufacturing the dielectric layer in thin film form is by sputter deposition of individual or alloy elemental targets in an oxygen containing plasma and/or sputter deposition of the compounds themselves sequentially or simultaneously or in a combination thereof. Physical evaporation and chemical vapor deposition techniques can also be used to form the dielectric layers. The dielectric layers are preferably 30–200 nm thick and have an index of refraction in the range between 1.4 and 2.4 and preferably an index of refraction of approximately 2.2 for the Kerr mode of operation and approximately 1.8 for the Faraday mode. It is also desirable that the dielectric layers are in an amorphous state in order to eliminate grain boundaries found in polycrystalline materials. The presence of grain boundaries results in the provision of sites for diffusion of atmospheric contaminants into the magneto-optic material layer or out-diffusion of magneto-optic constituents when the medium is heated or otherwise environmentally stressed.

The magneto-optic material layer 16 comprising any of the known magneto-optically active materials such as the rare earth-transition metal alloys such as TbFe, TbFeCo, GdCo among others as is known to those skilled in the art of magneto-optic recording. The thickness of the magneto-optic film layer is typically in the range between 2 and 200 nm depending on the recording mode and stack design.

The capping layer 20 is preferably an inexpensive, easy to deposit material such as aluminum and is typically greater than 2000 Å in thickness. The capping layer provides a dust-free, hermetically sealed environment for the magneto-optic storage medium. The present invention concerns the use of compound glasses having the chemical formula $SiO_2$—$MO_2$ or $SiO_2$—$M_2O_3$ or $SiO_2$—$M_2O_5$ and combinations thereof as the dielectric layer material. The element M is selected from Zr, Ti, Al, Nb, Y, Sn, In, Ta and Sb and preferably is Ti, Zr or Al. The advantage manifest by the use of compound glass dielectric layers is that the tendency of the M-containing compound to crystallize is suppressed by the glass forming $SiO_2$. Moreover, the physical, chemical and structural properties, and in particular the index of refraction are controllable by suitable adjustment of the relative percentages of the compound glass components.

The following examples demonstrate the effect of the component composition in a $SiO_2$—$ZrO_2$ and a $SiO_2$—$TiO_2$ binary system on the refractive index and density of the resultant sputtered thin films.

EXAMPLE 1

Figure 2:
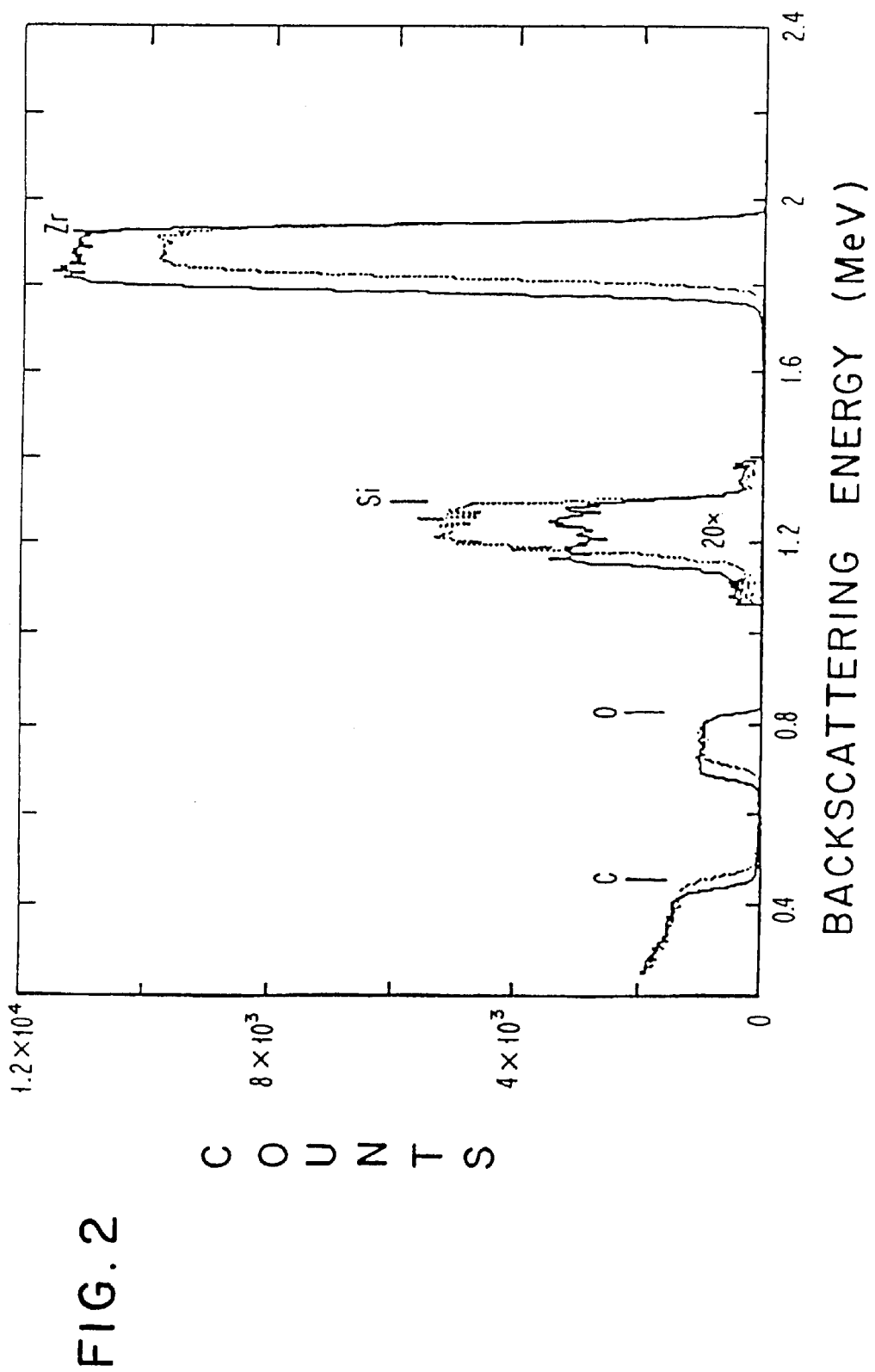
FIG. 2 is a graphical representation of the RBS spectra of $SiO_2$—$ZrO_2$ films with different compositions.
Figure 3:
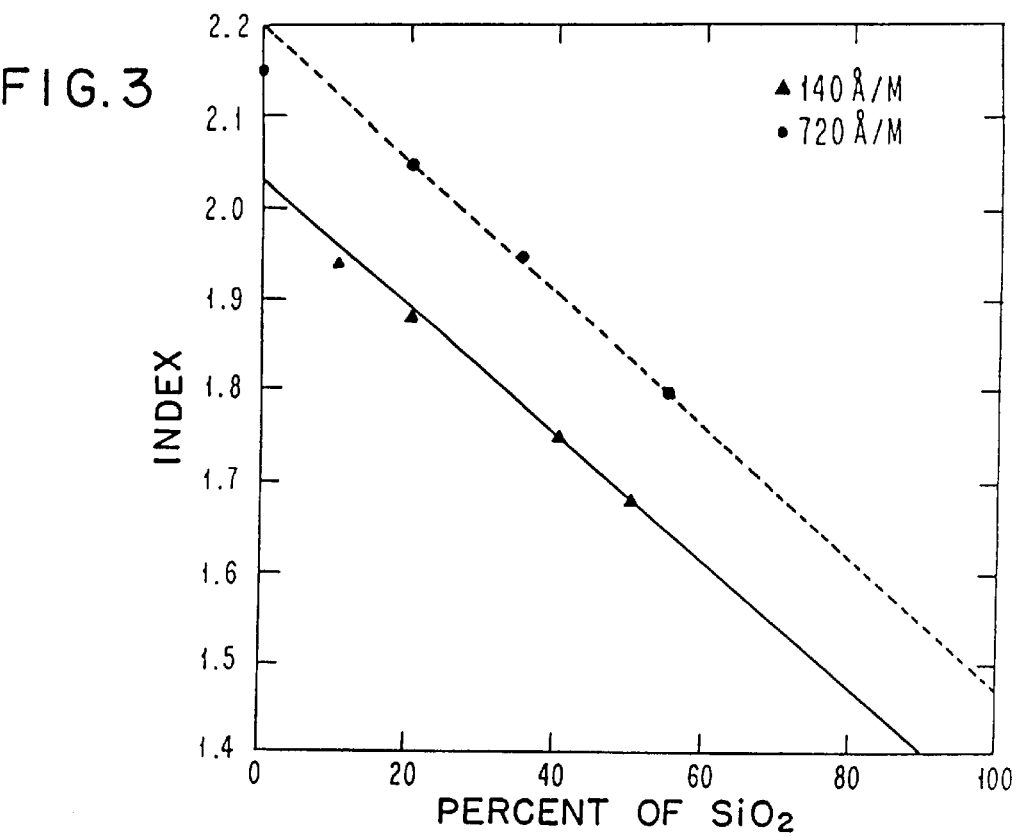
FIG. 3 is a graphical representation illustrating the dependence of the index of refraction (at 633 nm) on deposition rate and composition for $ZrO_2$—$SiO_2$ thin films made by reactive sputter deposition from individual elemental targets.

A mixed $SiO_2$—$ZrO_2$ film of varying composition was produced by dual source reactive magnetron sputtering in the following manner. Two high purity elemental targets of Zr and Si were mounted in a vacuum chamber in magnetron sputtering sources arranged in a colinear fashion to allow a compositional gradient to be established during each deposition run. The vacuum chamber was evacuated to at least $1 \times 10^{-5}$ T. A mixture of Ar and $O_2$, both 99.99% pure, was used as the sputter gas. The appropriate gas rations were established by a series of total pressure versus oxygen flow rate, for constant argon flow rate, measurements. These measurements established the pressure ranges in which the targets were still metallic and ranges in which the targets oxidized. It is preferred to deposit the mixed films while the targets are near the metallic state as higher deposition rates are achieved. Based on these measurements films were typically produced at total pressures between 5 and 7 mT with about 0.1 partial pressure of oxygen, these values were selected as a matter of convenience and are not indicative of process limitations. The sputtering power was varied from about 50 W/cm² to 10 W/cm² for each target to compensate for differences in sputter yields for Zr and Si as well as to provide compositional control. The full range of compositions from $ZrO_2$ to $SiO_2$ and deposition rates from 10 to 750 Å/m could be obtained by adjusting the target power levels and source to substrate distance. Fully oxidized films of mixed composition could easily be made by this technique. FIG. 2 is a graphical presentation of two Rutherford Backscattering spectra of films made by the above described technique which show that the films are fully oxidized and that the composition of each film is different. The film represented by the solid line has a composition of 0.94 $ZrO_2$-0.06 $SiO_2$ and the film represented by the dotted line has a composition of 0.83 $ZrO_2$-0.17 $SiO_2$. FIG. 3 shows the dependence of the index of refraction, measured at 830 nm, on deposition rate and composition for $SiO_2$—$ZrO_2$ films made by reactive sputter deposition from individual elemental targets. The dotted line represents the theoretical values of index of refraction expected for fully dense bulk samples determined by calculation and published data for bulk glass samples on the high $SiO_2$ end reported in the article by M. Nogami entitled, "Glass Preparation of the $ZrO_2$—$SiO_2$ System by the Sol-Gel Process from Metal Alkoides", Journal of Non-Crystalline Solids 69, (1985) 415–423. It should be noted that either r.f or d.c. sputtering could be used, although if d.c. sputtering is used for the Si then the target should be doped to have a sufficiently low resistivity for this process. Film thicknesses were typically in the 50 to 900 nm range for convenience of measuring optical and physical properties but are by no means restricted to that range. It was also determined that approximately 9 atomic percent $SiO_2$ is required in these mixed oxide films in insure the film is completely amorphous.

EXAMPLE 2

Figure 4:
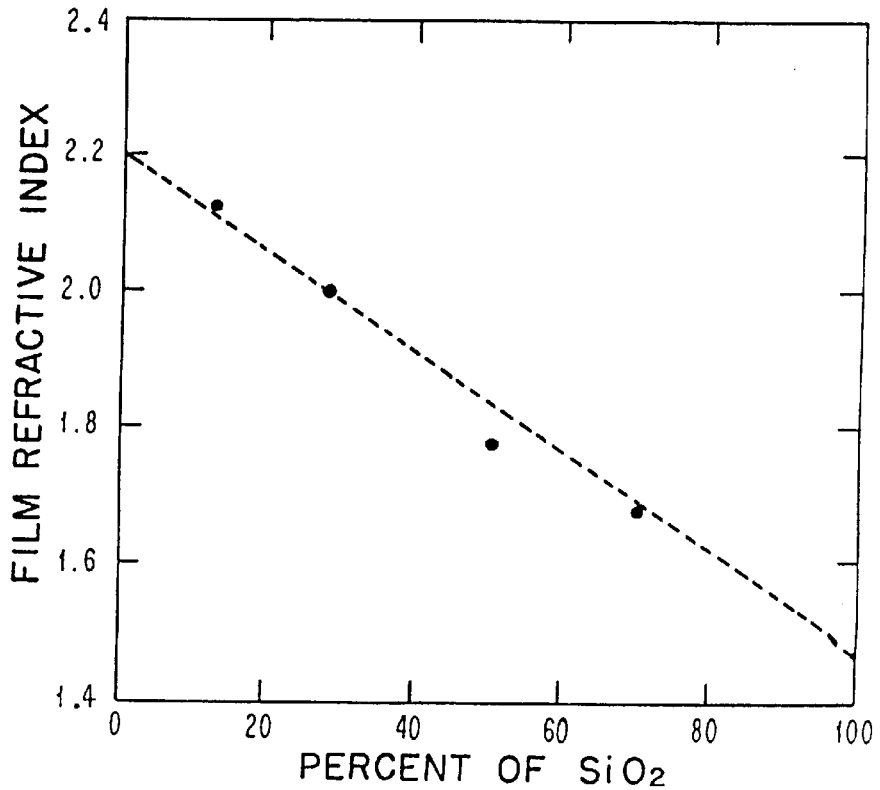
FIG. 4 is a graphical representation illustrating the dependence of the index of refraction (at 633 nm) on deposition rate and composition for $ZrO_2$—$SiO_2$ thin films made by reactive sputter deposition from Zr—Si elemental alloy targets.

Using the same vacuum chamber cited in example 1 as well as an ion beam sputter deposition system mixed composition films were also produced from elemental alloy targets. The compositions of the sputtering targets were (i) 87.4% Zr-12.6% Si, (ii) 73.5% Zr-26.5% Si, and (iii) 30% Zr-70% Si (actual atomic %). A 46% Zr-54% Si target was used for reactive ion beam sputter deposition. Again, conditions were determined where the ratio of oxygen to argon in the sputtering gas was sufficient to produce fully oxidized films using the single composition targets. The variation in index of refraction was also as expected as is shown in FIG. 4.

EXAMPLE 3

Figure 5:
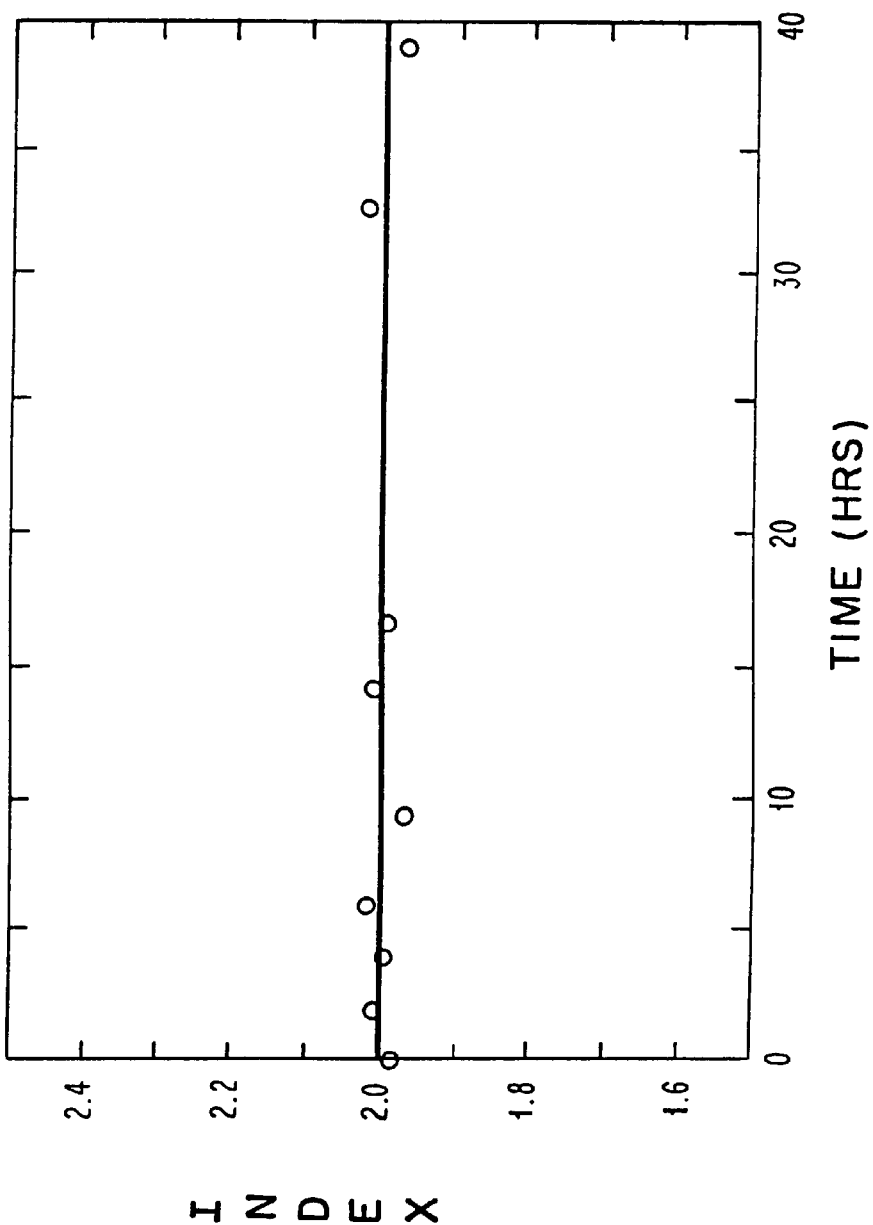
FIG. 5 is a graphical representation illustrating the index of refraction as a function of annealing film containing 20% $SiO_2$

A key feature of the present invention is the thermal stability of the amorphous films formed by mixing $SiO_2$ with the aforementioned M containing compounds. This is shown in FIG. 5 which is a graph of the index of refraction of a 20 $SiO_2$-80 $ZrO_2$ thin film as a function of annealing time. Under similar conditions pure $ZrO_2$ films exhibit crystallization and changes in index of refraction.

EXAMPLE 4

Figure 6:
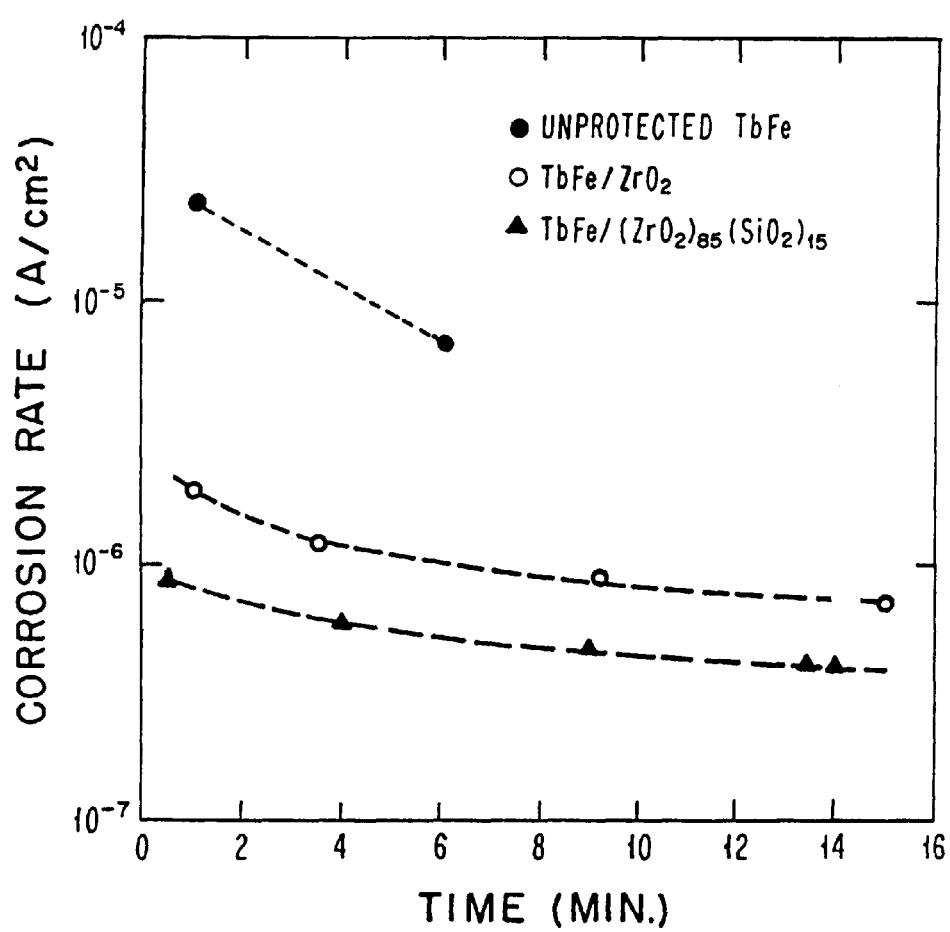
FIG. 6 is a graphical representation illustrating the enhanced corrosion protection afforded by amorphous mixed $SiO_2$—$ZrO_2$ film.

The advantage the present invention provides in the area of enhanced environmental protection of the magneto-optic storage media is demonstrated in the following manner. Several TbFe films about 1000 Å thick were coated with 700 to 900 Å thick films of a reactively sputter deposited $Zr_{0.854}Si_{0.146}O_2$ and tested for corrosion resistance as compared to uncoated TbFe and TbFe coated with an equivalent thickness of $ZrO_2$. The results are shown in FIG. 6. It can be seen that in deionized water, the agent used in this test, uncoated and unprotected TbFe has the highest corrosion rate and completely dissolves in about 6 minutes. In contrast, both the $ZrO_2$ and $SiO_2$—$ZrO_2$ coated films have a much lower corrosion rate with the mixed oxide film providing the lowest rate by a factor of two. This improvement is attributed to the fact that the addition of $SiO_2$ to the $ZrO_2$ changes the phase of the dielectric layer from polycrystalline to amorphous thereby eliminating grain boundary diffusion paths to the magneto-optic layer.

EXAMPLE 5

Figure 7A:
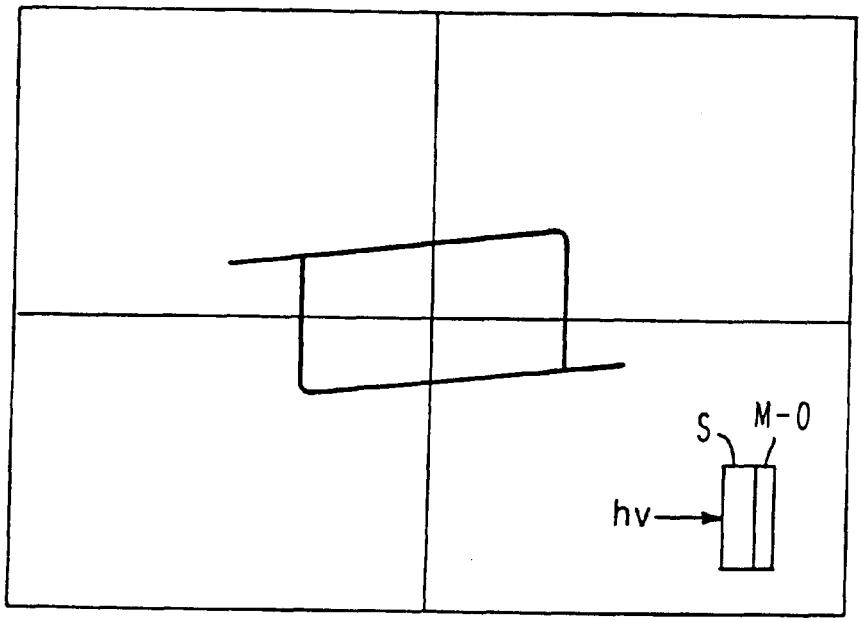
FIGS. 7A and 7B are graphical representations illustrating the enhancement of Kerr rotation provided by the application of mixed $SiO_2$—$ZrO_2$ film.
Figure 7B:
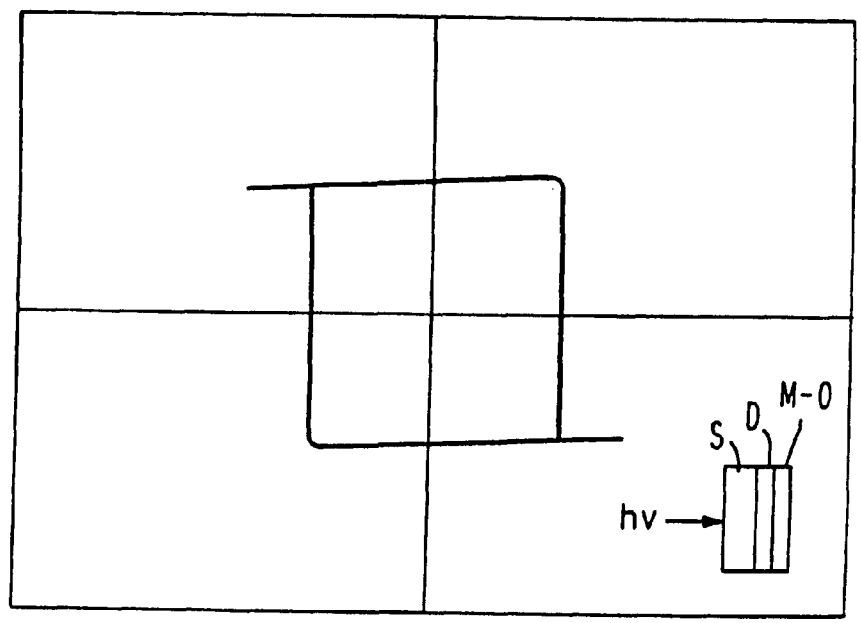

The optical quality of the amorphous $SiO_2$—$ZrO_2$ films was also verified by coating several fused silica substrates with quarter wave thicknesses (about 950 Å) of the $Zr_{0.854}Si_{0.146}O_2$ composition film and then TbFeCo magneto-optic films. FIG. 7A graphically illustrates typical Kerr loops of the media without the mixed oxide layer and FIG. 7B graphically illustrates typical Kerr loops of the media with the mixed oxide layer. All loops were measured in the backwall mode in that the magneto-optic media was addressed through the substrate and D1 layer as indicated in the figure insert. The expected optical enhancement was obtained as seen by the increase in the recorded Kerr rotation from 21.8 minutes to 42.9 minutes.

EXAMPLE 6

Figure 8:
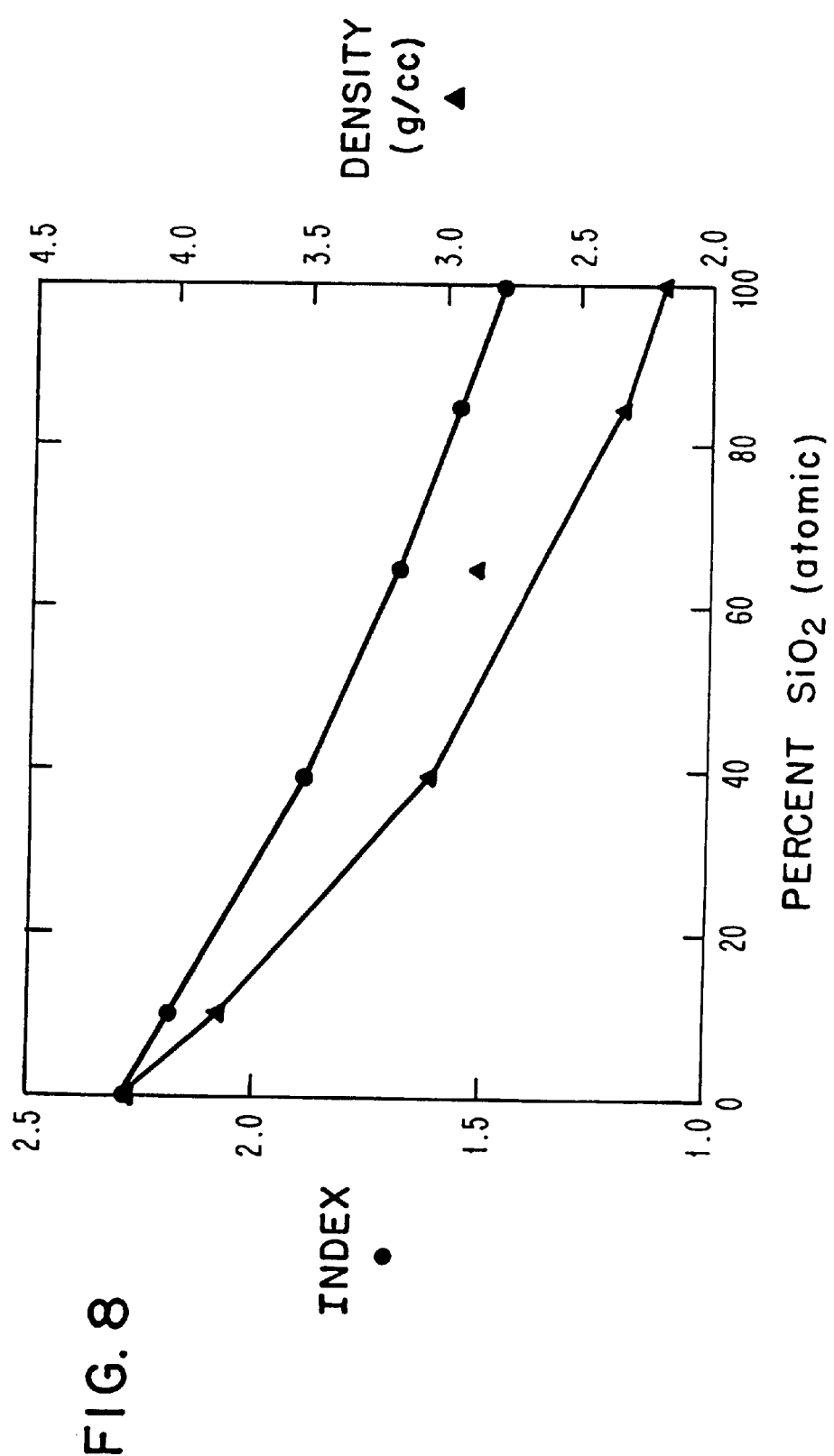
FIG. 8 is a graphical representation illustrating the dependence of the index of refraction (at 633 nm) on composition for $TiO_2$—$SiO_2$ thin films made by reactive sputter deposition from various alloy targets.

Similar results to those detailed above were obtained when a series of elemental alloy targets of Ti and Si were reactively sputtered. In this example it was found that about 3 at % $SiO_2$ added to $TiO_2$ was sufficient to produce a thermally stable mixed oxide amorphous film. FIG. 8 shows the dependence of index of refraction and density for the $SiO_2$—$TiO_2$ thin film system as a function of composition.

Glass network modifiers such as, but not limited to, BaO, ZnO, and PbO may be added to the compound glass to allow further control of optical or other properties as required in a particular situation. The glass network modifier is added to either or both dielectric layers 14, 18.

While there have been described and illustrated a preferred dielectric layer for use in a magneto-optic storage medium and a magneto-optic storage medium, it will be apparent to those skilled in the art that variations and modifications are possible without deviating from the broad principles of the present invention which shall be limited solely by the scope of the claims appended hereto.

What is claimed is:

1. A dielectric layer for use in magneto-optic storage media consisting of a binary oxide compound glass of $SiO_2$—$MO_2$, $SiO_2$—$M_2O_3$ or $SiO_2$—$M_2O_5$ without organic substances therein, wherein M is selected from the group consisting of Ti, Zr, Al, Nb, Y, Sn, In, Ta and Sb, and the relative percentages of $SiO_2$ and the M containing component adjusted to obtain an index of refraction in the range between 1.5 and 2.4 and the relative percentage of $SiO_2$ is sufficient for causing said compound glass to be in an amorphous state.

2. A dielectric layer as set forth in claim 1, wherein M is selected from the group consisting of Zr, Ti, and Al.

3. A dielectric layer as set forth in claim 1 wherein the compound glass is $SiO_2$—$TiO_2$.

4. A magneto-optic storage medium comprising:
a magneto-optic thin film having two surfaces, and
a dielectric layer deposited on at least one of said surfaces of said magneto-optic thin film,
said dielectric layer consisting of a binary oxide compound glass of $SiO_2$—$MO_2$, $SiO_2$—$M_2O_3$ or $SiO_2$—$M_2O_5$ without organic substances therein, wherein M is selected from the group consisting of Ti, Zr, Al, Nb, Y, Sn, In, Ta and Sb, and the relative percentages of $SiO_2$ and the M containing component adjusted to obtain an index of refraction in the range between 1.5 and 2.4 and the relative percentage of $SiO_2$ is sufficient for causing said dielectric layer to be in an amorphous state.

5. A magneto-optic storage medium as set forth in claim 4 where said magneto-optic thin film is a rare earth-transition metal alloy.

6. A magneto-optic storage medium as set forth in claim 4 where a dielectric layer is deposited on both surfaces of said magneto-optic thin film.

7. A magneto-optic storage medium as set forth in claim 6 where the dielectric layer deposited on a first surface of said magneto-optic thin film is different than the dielectric layer deposited on a second surface of said magneto-optic thin film.

8. A magneto-optic storage medium as set forth in claim 6 where the dielectric layer deposited on a first surface and on a second surface of said magneto-optic thin film is the same.

9. A magneto-optic storage medium comprising:
a substrate;
a first dielectric layer disposed on said substrate wherein said first dielectric layer consists of a binary oxide compound glass of $SiO_2$—$MO_2$, $SiO_2$—$M_2O_3$ or $SiO_2$—$M_2O_5$ without organic substances therein, wherein M is selected from the group consisting of Zr, Ti, Al, Nb, Y, Sn, In, Ta and Sb, and with the relative percentages of $SiO_2$ and the M containing component adjusted to obtain an index of refraction in the range between 1.5 and 2.4 and the relative percentage of $SiO_2$ is sufficient for causing said compound glass to be in an amorphous state;
a magneto-optic thin film layer disposed on said first dielectric layer, and
a second dielectric layer disposed on said magneto-optic thin film layer consisting of a binary oxide compound glass of $SiO_2$—$MO_2$, $SiO_2$—$M_2O_3$ or $SiO_2$—$M_2O_5$ without organic substances therein, wherein M is selected from the group consisting of Ti, Zr, Al, Nb, Y, Sn, In, Ta and Sb, and with the relative percentages of $SiO_2$ and the M containing component adjusted to obtain an index of refraction in the range between 1.5 and 2.4 and the relative percentage of $SiO_2$ is sufficient for causing said second dielectric layer to be in an amorphous state.

10. A magneto-optic storage medium as set forth in claim 9 where said substrate has a textured surface on which said first dielectric layer is disposed.

11. A magneto-optic storage medium as set forth in claim 9 further comprising a grooved layer disposed on said substrate and said first dielectric layer is disposed on said grooved layer.

12. A magneto-optic storage medium as set forth in claim 11, further comprising a protective layer disposed over said grooved layer, said first dielectric layer, said magnetic-optic thin film layer and said second dielectric layer.

13. A magneto-optic storage medium as set forth in claim 9 further comprising a protective layer disposed over said first dielectric layer, said magneto-optic thin film layer and said second dielectric layer.

14. A magneto-optic storage medium as set forth in claim 9, wherein said first and second dielectric layers are substantially the same composition.

15. A magneto-optic storage medium as set forth in claim 9, wherein said first and second dielectric layers are different compositions.

16. A magneto-optic storage medium as set forth in claim 11 wherein said first and second dielectric layers are substantially the same composition.

17. A magneto-optic storage medium as set forth in claim 11 wherein said first and second dielectric layers are different compositions.

18. A magneto-optic storage medium as set forth in claim 12 where said substrate is glass, said grooved layer is a photosensitive polymer material, said first and second dielectric layers comprise a compound glass of $SiO_2$—$ZrO_2$, said magneto-optic layer is a rare earth-transition metal and said protective layer is aluminum.

19. A magneto-optic storage medium as set forth in claim 12 where said substrate is glass, said grooved layer is a photosensitive polymer material, said first and second dielectric layers comprise a compound glass of $SiO_2$—$TiO_2$, said magneto-optic layer is a rare earth-transition metal and said protective layer is aluminum.

20. A magneto-optic storage medium as set forth in claim 9, where said substrate is glass, said first dielectric layer and said second dielectric layer comprise a compound glass of $SiO_2$—$ZrO_2$, said magneto-optic layer is a rare earth transition-metal and said protective layer is aluminum.

21. A magneto-optic storage medium as set forth in claim 9, where said substrate is glass, said first dielectric layer and said second dielectric layer comprise a compound glass of $SiO_2$—$TiO_2$, said magneto-optic layer is a rare earth transition-metal and said protective layer is aluminum.

22. A dielectric layer for use in magneto-optic storage media consisting of a binary oxide compound glass of $SiO_2$—$ZrO_2$, $SiO_2$—$ZrO_3$ or $SiO_2$—$Zr_2O_5$ without organic substances therein and with the relative percentages of $SiO_2$ and the Zr containing component adjusted to obtain an index of refraction in the range between 1.5 and 2.4 and the relative percentage of $SiO_2$ is sufficient for causing said compound glass to be in an amorphous state.

23. A magneto-optic storage medium comprising:

a magneto-optic thin film having two surfaces, and a dielectric layer deposited on at least one of said surfaces of said magneto-optic thin film, said dielectric layer consists of a binary oxide compound glass of $SiO_2$—$ZrO_2$, $SiO_2$—$Zr_2O_3$ or $SiO_2$—$Zr_2O_5$ without organic substances therein and with the relative percentages of $SiO_2$ and the Zr containing component adjusted to obtain an index of refraction in the range between 1.5 and 2.4 and the relative percentage of $SiO_2$ is sufficient for causing said dielectric layer to be in an amorphous state.

24. A magneto-optic storage medium as set forth in claim 23 where said magneto-optic thin film is a rare earth-transition metal alloy.

25. A magneto-optic storage medium as set forth in claim 23 where a dielectric layer is deposited on both surfaces of said magneto-optic thin film.

26. A magneto-optic medium as set forth in claim 25 where the dielectric layer deposited on a first surface of said magneto-optic thin film is different than the dielectric layer deposited on a second surface of said magneto-optic thin film.

27. A magneto-optic storage medium as set forth in claim 25 where the dielectric layer deposited on a first surface and on a second surface of said magneto-optic thin film is the same.

28. A magneto-optic storage medium comprising:

a substrate;

a first dielectric layer disposed on said substrate wherein said first dielectric layer consists of a binary oxide compound glass of $SiO_2$—$ZrO_2$, $SiO_2$—$Zr_2O_3$ or $SiO_2$—$Zr_2O_5$ without organic substances therein and with the relative percentages of $SiO_2$ and the Zr containing component adjusted to obtain an index of refraction in the range between 1.5 and 2.4 and the relative percentage of $SiO_2$ is sufficient for causing said first dielectric layer to be in an amorphous state;

a magneto-optic thin film layer disposed on said first dielectric layer, and a second dielectric layer disposed on said magneto-optic thin film layer wherein said second dielectric layer consists of a binary oxide compound glass of $SiO_2$—$ZrO_2$, $SiO_2$—$Zr_2O_3$ or $SiO_2$—$Zr_2O_5$ without organic substances therein and with the relative percentages of $SiO_2$ and the Zr containing component adjusted to obtain an index of refraction in the range between 1.5 and 2.4 and the relative percentage of $SiO_2$ is sufficient for causing said second dielectric layer to be in an amorphous state.

29. A magneto-optic storage medium as set forth in claim 28 here said substrate has a textured surface on which said first dielectric layer is disposed.

30. A magneto-optic storage medium as set forth in claim 28 further comprising a grooved layer disposed on said substrate and said first dielectric layer is disposed on said grooved layer.

31. A magneto-optic storage medium as set forth in claim 30, further comprising a protective layer disposed over said grooved layer, said first dielectric layer, said magnetic-optic thin film layer and said second dielectric layer.

32. A magneto-optic storage medium as set forth in claim 28 further comprising a protective layer disposed over said first dielectric layer, said magneto-optic thin film layer and said second dielectric layer.

33. A magneto-optic storage medium as set forth in claim 28, wherein said first and second dielectric layers are substantially the same composition.

34. A magneto-optic storage medium as set forth in claim 28, wherein said first and second dielectric layers are different compositions.

35. A magneto-optic storage medium as set forth in claim 30 wherein said first and second dielectric layers are substantially the same composition.

36. A magneto-optic storage medium as set forth in claim 30 wherein said first and second dielectric layers are different compositions.

37. A magneto-optic storage medium as set forth in claim 31 where said substrate is glass, said grooved layer is a photosensitive polymer material, said first and second dielectric layers comprise a compound glass of $SiO_2$—$ZrO_2$, said magneto-optic layer is a rare earth-transition metal and said protective layer is aluminum.

38. A magneto-optic storage medium as set forth in claim 28, where said substrate is glass, said first dielectric layer and said second dielectric layer comprise a compound glass of $SiO_2$—$ZrO$, said magneto-optic layer is a rare earth transition-metal and said protective layer is aluminum.

39. A dielectric layer as set forth in claim 22 wherein the compound glass is $SiO_2$—$ZrO_2$.

* * * * *

UNITED STATES PATENT AND TRADEMARK OFFICE
CERTIFICATE OF CORRECTION

PATENT NO. : 6,214,482 B1
DATED : April 10, 2001
INVENTOR(S) : C.V. Jahnes et al.

Page 1 of 1

It is certified that error appears in the above-identified patent and that said Letters Patent is hereby corrected as shown below:

Column 2,
Line 25-26, "A principal" should begin new paragraph.

Column 4,
Line 67, "The present invention" should begin new paragraph.

Column 9, claim 22,
Line 5, "ZrO3" should read -- $Zr_2O_3$ --

Column 10, claim 29,
Line 11, "here" should read -- where --

Signed and Sealed this

Twenty-ninth Day of January, 2002

Attest:

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,214,482 B1
DATED : April 10, 2001
INVENTOR(S) : C.V. Jahnes et al.

It is certified that error appears in the above-identified patent and that said Letters Patent is hereby corrected as shown below:

Title page,
Item [73], Assignee, "Information" should read -- International --.

Signed and Sealed this

Fifteenth Day of November, 2005

JON W. DUDAS
*Director of the United States Patent and Trademark Office*